(12) United States Patent  (10) Patent No.: US 9,272,723 B2
Prasad  (45) Date of Patent: Mar. 1, 2016

(54) RETRACTABLE, SANITARY COVERING SLEEVE

(71) Applicant: Shivaji Prasad, Herndon, VA (US)

(72) Inventor: Shivaji Prasad, Herndon, VA (US)

(*) Notice: Subject to any disclaimer, the term of this patent is extended or adjusted under 35 U.S.C. 154(b) by 0 days.

(21) Appl. No.: 14/482,866

(22) Filed: Sep. 10, 2014

(65) Prior Publication Data

US 2015/0069726 A1  Mar. 12, 2015

Related U.S. Application Data

(60) Provisional application No. 61/875,766, filed on Sep. 10, 2013, provisional application No. 61/875,790, filed on Sep. 10, 2013, provisional application No. 61/875,846, filed on Sep. 10, 2013.

(51) Int. Cl.
    *B62B 5/06* (2006.01)

(52) U.S. Cl.
    CPC ........................... *B62B 5/069* (2013.01)

(58) Field of Classification Search
    CPC ........ B62B 5/069; B62B 5/06; B62B 3/1416; F16L 11/16; F16L 57/00; F16L 659/022
    See application file for complete search history.

(56) References Cited

U.S. PATENT DOCUMENTS

| | | | | |
|---|---|---|---|---|
| 4,557,309 A * | 12/1985 | Judkins | .................... | E06B 9/262 160/279 |
| 5,727,599 A * | 3/1998 | Fisher | .................... | F16L 59/022 138/110 |
| 5,820,142 A * | 10/1998 | Duer | ....................... | B62B 5/069 150/154 |
| 6,981,707 B1 * | 1/2006 | Dandy | ..................... | B62B 5/06 150/154 |
| 7,611,156 B2 * | 11/2009 | Dunser | ................... | B08B 9/023 280/33.992 |
| 8,590,951 B1 * | 11/2013 | Calabro | ................. | B60R 13/04 293/126 |
| 9,015,905 B1 * | 4/2015 | Chen | ..................... | E05B 1/0069 16/110.1 |
| 2007/0245850 A1 * | 10/2007 | Ramali | .................. | A47B 95/02 74/551.9 |
| 2008/0190527 A1 * | 8/2008 | Guercia | .................... | B62B 5/06 150/155 |
| 2008/0191435 A1 * | 8/2008 | Guercia | ................ | B62B 3/1408 280/33.992 |
| 2009/0199360 A1 * | 8/2009 | Madanat | .................. | B62B 5/06 16/111.1 |
| 2010/0212094 A1 * | 8/2010 | Cohen | .................... | B08B 9/023 15/104.04 |
| 2011/0182769 A1 * | 7/2011 | Rich | ........................ | A61L 2/18 422/28 |
| 2012/0148783 A1 * | 6/2012 | Kunkleman | ............ | B62B 5/069 428/43 |
| 2012/0240307 A1 * | 9/2012 | Terrell | ............... | A41D 19/0086 2/158 |

* cited by examiner

*Primary Examiner* — Katy M Ebner
*Assistant Examiner* — Emma K Frick
(74) *Attorney, Agent, or Firm* — Raymond Van Dyke; Van Dyke Law

(57) ABSTRACT

A small container partitioned into two sections—one for housing a pair of retractable cords and the other half for housing a packet containing sanitizing material. Each of the sections have empty spaces therein and are conjoined together via click-and-lock hinges. The empty spaces between two sections when conjoined, they together house the protective covering sleeve. In operation, a user engages a cart handle by attaching the device thereto, and can detach the two sections from each other easily. The two sections when separated deploy the protective covering sleeve over the surface of the handle, providing a sanitary surface for the user to grip.

18 Claims, 7 Drawing Sheets

RETRACTABLE, SANITARY COVERING SLEEVE

CROSS REFERENCE TO RELATED APPLICATIONS

The present invention claims priority from pending U.S. Provisional Patent Application Ser. No. 61/875,766, filed Sep. 10, 2013, pending U.S. Provisional Patent Application Ser. No. 61/875,790, filed Sep. 10, 2013, and U.S. Provisional Patent Application Ser. No. 61/875,846, filed Sep. 10, 2013, each entitled "Retractable Covering Sleeve for Shopping and Service Cart Handle(s) to Avoid Germ(s) and Bacterial Infection(s)," the subject matters of which are incorporated by reference herein in their entireties.

BACKGROUND OF INVENTION

A benefit of modern society is the elimination of many diseases, and the ongoing prevention of many others, including the common cold. Elaborate measures are taken to minimize the threat posed by pathogens of every sort. However, even with cleaning dispensers distributed widely, the spread of bacteria and viruses continues, even in a modern society, requiring ever more diligence and ingenuity to fight contagions and colds. The instant invention addresses this problem head on with an elegant solution.

One of the more prevalent means of germ transmission is by touch. A given individual comes into contact with pathogens in many ways, and the passage of these pathogens from the hands to the face is common. Thus, efforts to prevent this pathogen transmission mechanism are useful in the prevention of disease. For example, in shopping malls, grocery stores, amusement parks, hospitals, airports, loading/unloading docks and many other areas, one often grabs a shopping cart or service cart by the handle, usually with their bare hands, and then pulling/pushing, rolling the cart along, while picking different items from the shelves and placing them into the cart. Undoubtedly, the cart handle was touched by many shoppers and servicers before your arrival, and will be so touched countless times again after you. Thus, the handle of a cart is frequently touched by the bare hands of many shoppers and servicers every day. It is thus also true that when you touch or contact the handle with your own bare hand or hands, not only you have contaminated your hands with germs, bacteria and viruses left on the handle by previous cart users, but you have also left your own germs, bacteria, fungi and viruses on the handle for the next shopping cart user or cart handler. Everyone is a vector.

Researchers at the University of Arizona were so overwhelmed by this issue of cross contamination of germs, bacteria, fungi, viruses and disease-causing organisms, that they conducted intensive research on cross contamination of disease-causing organisms present on cart handles, particularly shopping carts commonly used in grocery stores. Their research results revealed beyond any doubt that such cart handles were dirtier than public restrooms. Commonly-found contaminants observed on cart handles include blood from meat, fish and chicken products, as well as fecal, urine, felgal excretions from coughs and sneezing from children and human shoppers. Their analysis showed that some of the cart handles tested carried live and virulent germs and bacteria. In Applicant's own analysis, a cart handle, such as a shopping cart handle, becomes quite dirty after the touch of unclean hands, especially after use of urinals and toilets. Even with the prevalence of hand sanitizers, the passage of pathogens is easy.

In the shopping cart scenario, one can easily imagine cross contaminations due to an adult shopper or cart handler having a cold, the flu and/or allergies, and who is coughing and/or sneezing into their hands. Additionally, a child with a runny nose and sticky fingers touching and holding the cart handle can easily be foreseen.

Additional shopping cart contamination situations can easily be imagined, such as where people not washing their hands after using toilets and bathrooms, a package containing meat or chicken not properly wrapped or cleaned leaking or spilling, contaminating the cart, the handles, the floor and your hands trying to fix this problem. Think of the situations of when people flit round testing and eating free samples of eateries from vendors advertising their new brands of food and snacks in stores. People eat such food samples and then put their hands on cart handles without washing their hands, contaminating the handle and then your hands with their germs and infections left behind. In this manner, contaminations of e-coli and salmonella amongst others can easily be transmitted with the cart handle as the vector.

As set forth herein and studied at length, shopping cart handles, as well as other publicly-used handles, are quite dirty and usually infested with germs and bacteria, causing a danger to health. Therefore, it is not surprising that there are prior art inventions about protecting the populace from such infections. Despite the critical health concerns due to contaminates and infections caused by touching the handles of carts, Applicant has not seen any handle covers being used by shoppers to effectively and conveniently cover the cart handles, as well as other service cart handles, such as in hospitals.

Another disadvantage seen by Applicant is that these prior art approaches do not offer convenience in the use of the product, such as not being handy enough to carrying along when going for shopping or using carts in hospitals, airports and other places. Further, most of the prior art approaches that discuss covering have bulky plastic structures and use papers, which require frequent disposal after each and every single use of the handle cover. As is understood, the manufacture of such paper is wasteful and requires cutting numerous trees and processing in factories to produce them. As is known, cutting trees and destroying forests are the major causes of creating unhealthy environments and living conditions congenial for life of human and other organisms. All in all, in these earlier approaches the disposal handle cover papers after each and every single use of carts further adds to the waste accumulation and landfills resulting in further degradation of water, air and environmental resources.

There is, therefore, a present need for an improved approach in preventing pathogens in particular areas from spreading. This need is met in the present invention, which discloses a convenient and effective tool and methodology for minimizing or eliminating the transmission of pathogens in those areas.

Therefore, objectives of the present invention in developing an improved handle cover are at least four fold: simplicity, small size, durability and sanitary.

An object of the present invention is that the device or apparatus so produced is simple to understand, and easy and convenient to use.

Another object of the present invention is that the device or apparatus have a small size and be handy to use. For example, constructed so that anyone can easily carry the device, such as on a keychain, clipped to a waist belt, or stored or placed in a small bag. It should be unobtrusive and even undetectable to others.

A further object of the present invention is that it be durable, being made of durable materials and preferably 100% machine washable in cold and hot water.

Further, another object of the present invention is that it be sanitary. In addition to being made of durable and washable material, the object or device can be washed as many times as needed. The device may also include a sanitizer in order to sanitize inner surfaces of the device even before mounting it on a cart handle.

As a further object of the present invention, Applicant notes that the present invention, in addition to being handy to use and environmentally friendly, have an aesthetic appearance so that anyone can employ their own device for their personal use without fear of undue notice.

Additionally, an object of the present invention is to provide a media for advertising with the display of words or symbols on the unfurled covering sleeve.

SUMMARY OF THE PRESENT INVENTION

The device is a small container and it is partitioned into two sections—one for housing a pair of retractable cords and the other half for housing a packet containing sanitizing material. Each of the sections have empty spaces therein and are conjoined together via click-and-lock hinges. The empty spaces between two sections when conjoined, together house the protective covering sleeve. In operation, a user engages a cart handle by attaching the device thereto, and can detach the two sections from each other easily. The two sections when separated deploy the protective covering sleeve over the surface of the handle, providing a sanitary surface for the user to grip.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

The present invention will now be described more fully hereinafter with reference to the accompanying DRAWINGS, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

As discussed, the various prior inventions lack convenience-in-use by cart handlers in shopping stores, malls, airports, hospitals and other places where carts are being used. These prior art devices are not only of bigger size, inconvenient shape and design, but the prior art solutions are quite cumbersome. Most likely, the considerable inconvenience of their use is the single most compelling reason that shoppers and cart handlers are not actually using these handle covers on the handles of their shopping carts in stores, shopping malls, carrying luggage at airports, service carts in hospitals and amusement parks.

Additionally, none of the prior art include retracting mechanisms, as set forth herein and claimed. In the present invention, a pair of retractable reels have been used in order to retract the cover sleeve system back to its housing.

Indeed, Applicant found that all of the prior inventions directed to the protection of health from infectious disease causing germs, fungi, bacteria and viruses, require taking the cover parts out of bag and then placing their multiple parts on the handle of the cart in order to cover it. Another technique requires peeling and detaching cover papers onto the handle bar and then disposing them after every single use. The requirements of these prior art devices are usually quite involved and cause inconvenience in using them. Currently existing handle covers are not only bulky and cumbersome to use, but also they require disposable cover materials, which generate unnecessary and large amounts of garbage, causing harm to air, water and soil, and degrading environmental resources vital to our survival. Prior inventions related to sanitizing systems contain bulky parts rendering their use inconvenient and requiring larger space to store them.

Figure 1:
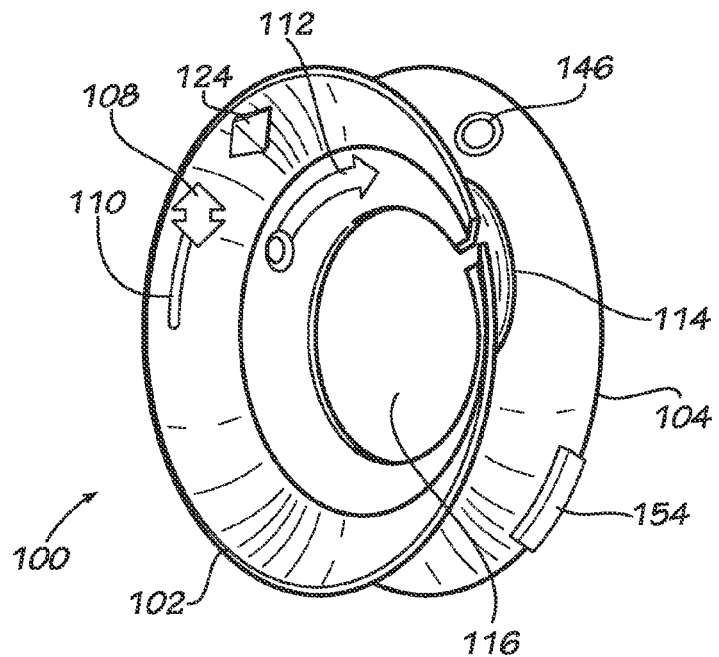
FIG. 1 is a perspective view of the protective cover sleeve device of the present invention in an assembled state.
Figure 2:
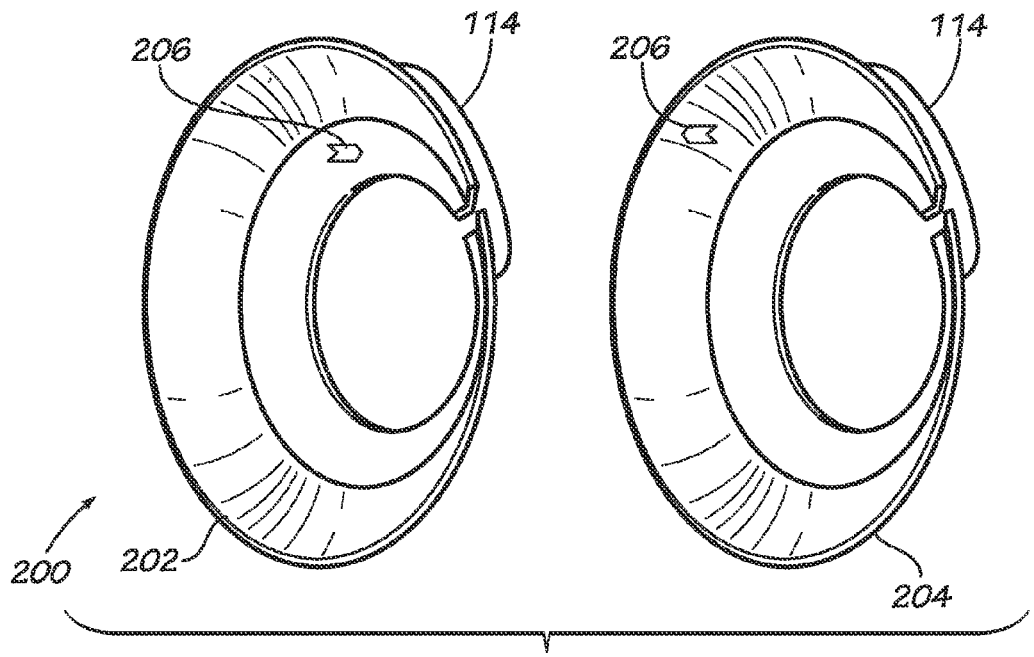
FIG. 2 is a perspective view of external sections of the protective cover sleeve device shown in FIG. 1 in a disassembled state.

With reference now to FIGS. 1 and 2 of the DRAWINGS, there is illustrated therein a container box pursuant to a first embodiment of the present invention, generally designated by the reference numeral 100 and 200, respectively, that houses the components for engaging the dirty handle bars across the world. In particular, the container 100 is divided into two sections, a left section and a right section, generally designated by the reference numerals 102/202 and 104/204, respectively, which are conjoined, such as using Lock-and-Open, click-in clutches, generally designated by the reference numeral 206, with fasteners in order to mount and secure these sections on the handle of the cart.

Figure 3A:
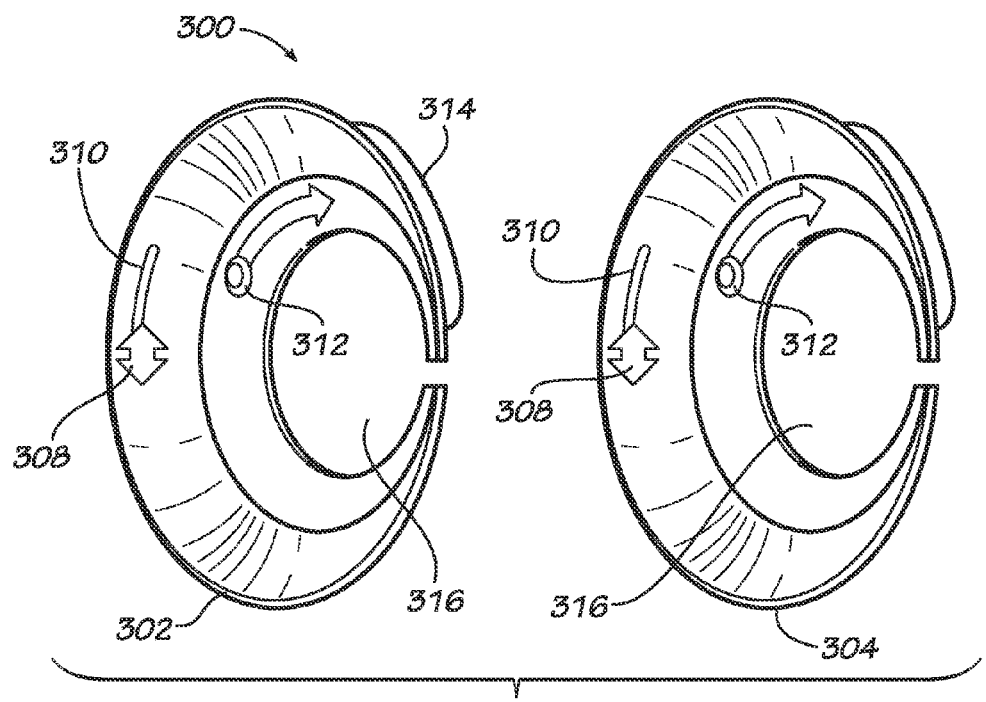
FIG. 3A is a plan view of a locking latch and handle gripping for the externals sections of the protective cover sleeve device shown in FIG. 2, showing the handle in an un-gripped position.

With reference now to FIG. 3A of the DRAWINGS, there are shown the aforementioned left 302 and right 304 sections of the container 100 separated, generally designated by the reference numeral 300. This Figure illustrates a way to mount the device on one end of a cart handle, discussed further hereinbelow, where the left section 302 stays fixed on the cart handle, and the right section 304 is movable and pulled toward the other end of the cart handle, where it is then fastened at that end of the handle. Both the left 302 and the right 304 sections have gripper knobs, generally designated by the reference numeral 308 (also reference numeral 108 in FIG. 1), configured within a gripper knob slit, generally designated by the reference numeral 310 (also reference numeral 110 in FIG. 1). The gripper knobs 108/308 are connected to a corresponding locking latch, generally designated by the reference numeral 312 (also reference numeral 112 in FIG. 1), where each of said locking latches 312 are connected a locking slider, generally designated by the reference numeral 314 (also reference numeral 114 in FIG. 1).

Figure 3B:
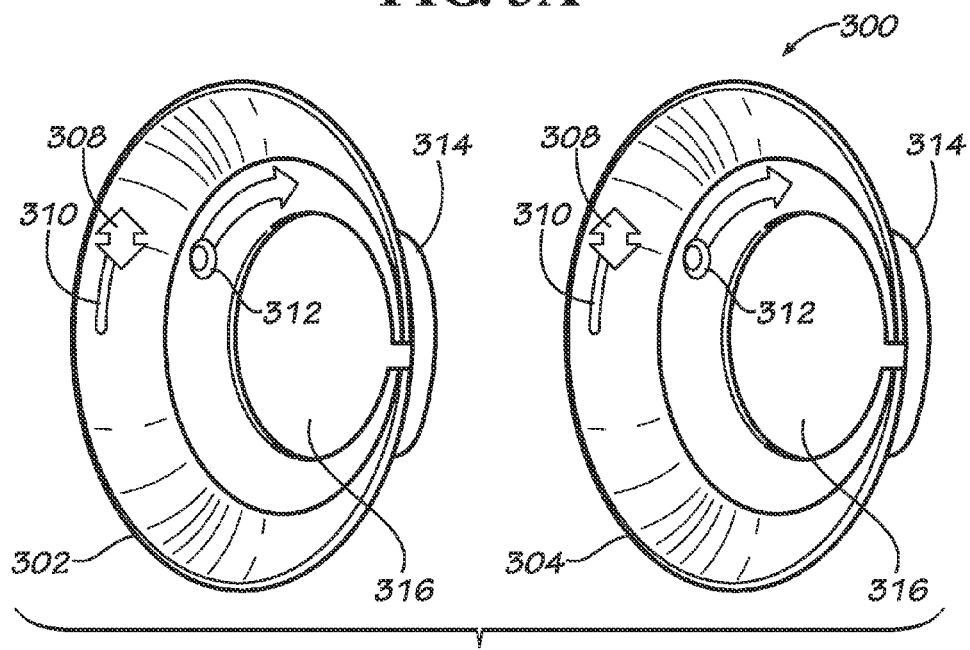
FIG. 3B is a plan view of the locking latch and handle gripping, as shown in FIG. 3A, but with the handle in a gripped position.

As shown in FIG. 3A, the locking slider 314 can be moved to expose an opening, generally designated by the reference numeral 316 (also reference numeral 116 in FIG. 1), a space within the device 100 that becomes open for receiving a handle bar. With reference now to FIG. 3B of the DRAWINGS, also depicting the container sections separated, generally designated by the reference numeral 300, after the handle bar is in the opening 116/316, then the slider 114/314 is moved down in order to close the opening 116/316, i.e., cover the slot for receiving the handle therethrough into the opening or space 116/316, forming a gripped position. As illustrated, each of the gripper knobs 108/308 also has a separate gripper or fastener, which grips the handle of the cart securely.

Figure 4A:
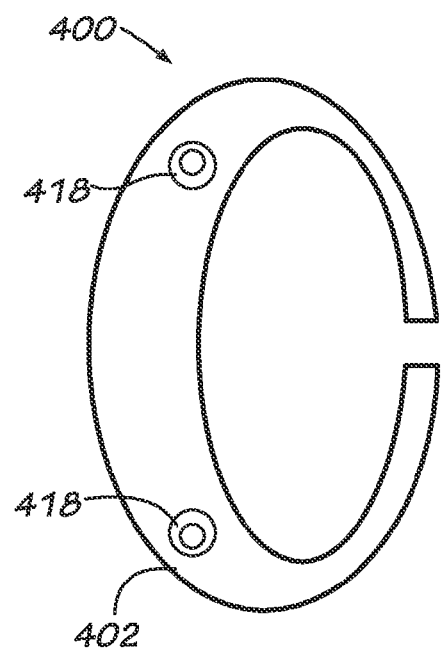
FIG. 4A is a plan view of additional components of the device shown in FIG. 1, including a container for a coil.
Figure 4B:
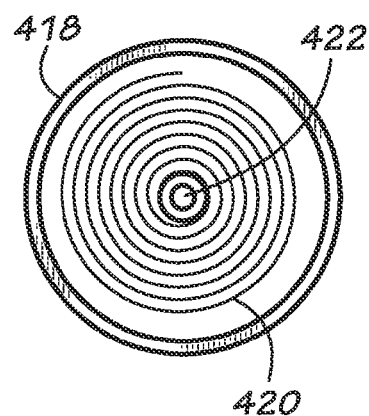
FIG. 4B is a plan view of a coil, such as may be used in the container in shown in FIG. 4A.

With reference now to FIG. 4A of the DRAWINGS, there is illustrated additional components for the right section 402 of the container 100. In particular, there are two coil containers, generally designated by the reference numeral 418, each housing an elastic coil. As shown in FIG. 4B of the DRAWINGS, each elastic coil, generally designated by the reference numeral 420, is held securely with a pivot, generally designated by the reference numeral 422. The coils 420 are stretchable and retractable.

Figure 4C:
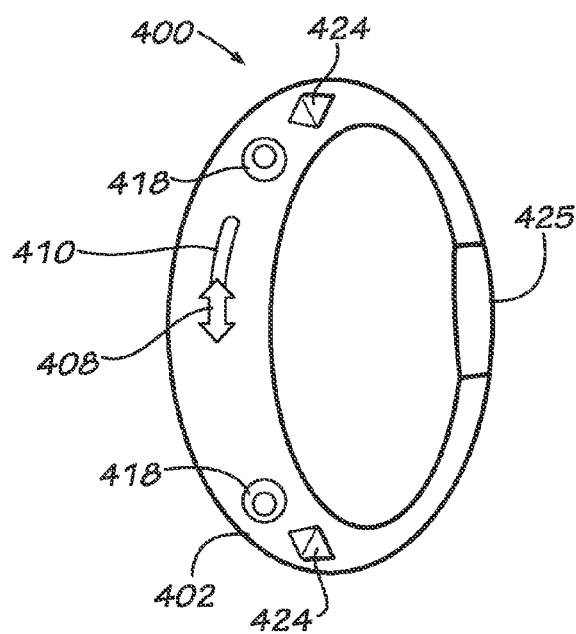
FIG. 4C is a plan view of the components shown in FIG. 4A with the coils shown in FIG. 4B and switches.

With reference now to FIG. 4C of the DRAWINGS, this Figure, generally designated by the reference numeral 400, illustrates the relationship between a respective coil 420 in a respective coil container 418 to respective switches, generally designated by the reference numeral 424 (also reference numeral 124 in FIG. 1), that control, i.e., releases, tension in the coils, as described in more detail hereinbelow. It should be understood that the switches 124/424, when pressed down, release the grip from the respective coils 420, letting cords be pulled out to deploy and implement the inner covering sleeve present invention, as described in more detail hereinbelow.

Also shown in FIG. 4C is a slit portion, generally designated by the reference numeral 425. It should be understood that the slit portion 425 may be a void, i.e., an opening through the left section 102, or may comprise a hinged-style component that permits movement of the handle therethrough to the opening 316.

Figure 5:
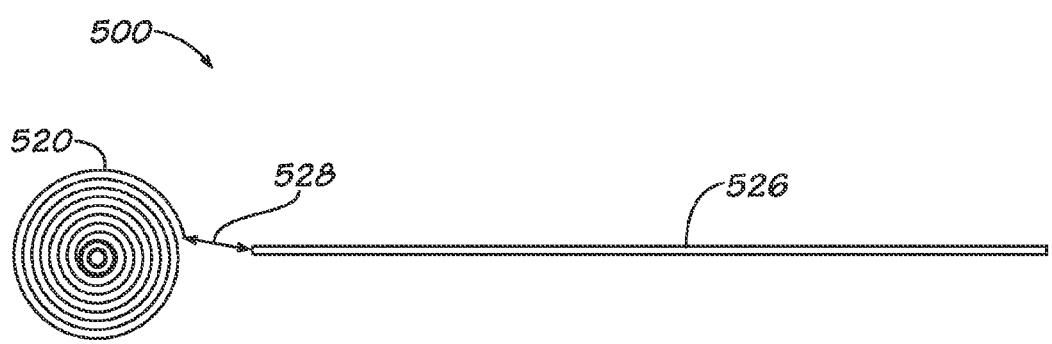
FIG. 5 is a plan view of a retracting system employing the coil containers shown in FIG. 4B.

With reference now to FIG. 5 of the DRAWINGS, there is illustrated relationships between retracting coils 520 and cords, generally designated by the reference numeral 500. As shown in FIG. 5, the inner end of each of the coils, generally designated by the reference numeral 520, is securely attached to a central pivot, such as pivot 422, of the coil container 418 in which each coil are housed. As shown, the outer end of each of the coils 520 is attached to an inner end of the respective cords 526 using a linkage therebetween, generally designated by the reference numeral 528, As shown in FIG. 5, there are two cords 526, which are preferably made up of a materials that is very strong, flexible, machine washable in cold and hot water, and very thin in diameter. It should also be understood that the cords are of variable length and enough (or sufficient) so as to accommodate the variable lengths of the handles of the carts.

Figure 6:
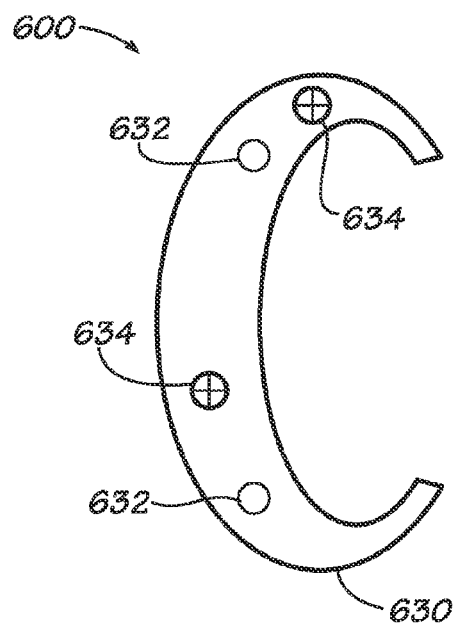
FIG. 6 is a plan view of a plate for the external sections as shown in FIG. 2.

With reference now to FIG. 6 of the DRAWINGS, there is illustrated a pair of plates, generally designated by the reference numeral 630, for insertion into the aforementioned right and left sections of the container 100. The plates 630 preferably have two holes, generally designated by the reference numeral 632, through which the aforementioned cords 526 pass and secured thereto. With reference to FIG. 6, there are also shown two screws, generally designated by the reference numeral 634, for each plate 630 to securely fasten the plates 630 to the respective left 102 and right 104 sections of the container 100, providing anchors for the cords 526.

Figures 7A, 7B:
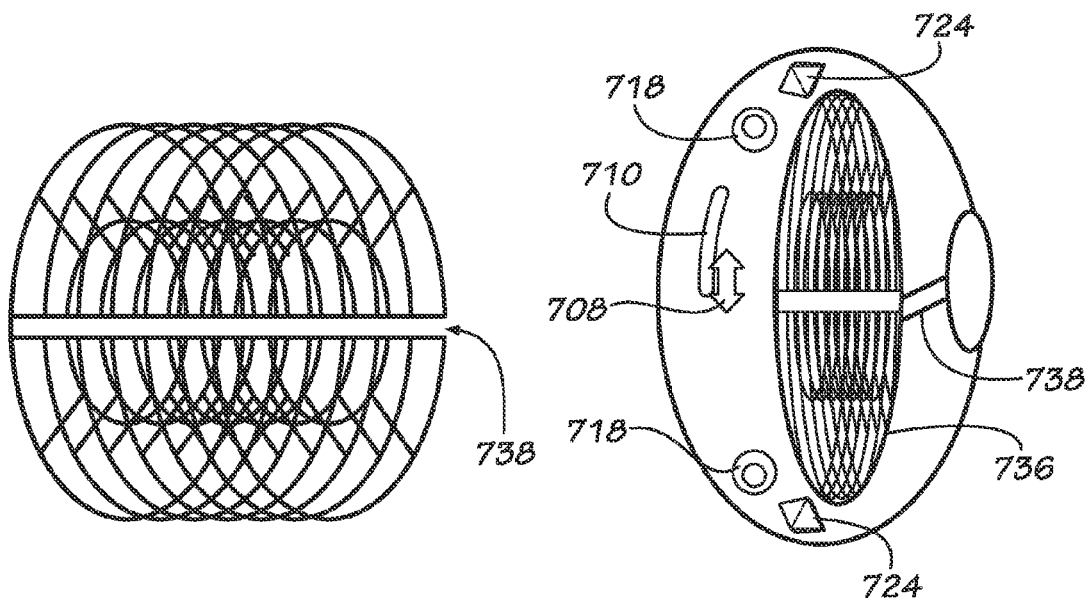
FIG. 7A illustrates a covering sleeve configured for inside the device shown in FIG. 1, in an inside view, where the cover sleeve is in a folded or squeezed position.
FIG. 7B is a plan view of the covering sleeve of FIG. 7A inside the device of FIG. 1, where the covering sleeve is in a folded or squeezed position.

With reference now to FIGS. 7A and 7B of the DRAWINGS, there are depicted various components of the cover sleeve of the present invention, generally designated by the reference numeral 736. As indicated, in a first embodiment of the present invention the cover sleeve 736 is preferably housed in the left section 102 of the device 100, within which it is folded and squeezed therein when the device 100 is not in use, as shown in compacted shape in FIG. 7A. To accompany the passage of the cart handle into the device 100, the cover sleeve 736 has a slit or cut along the side, generally designated by the reference numeral 738, whereby the handle may pass through when the device 100 is employed. As shown in FIG. 7B, the cover sleeve 736 fits easily into the left section 702.

Figure 8:
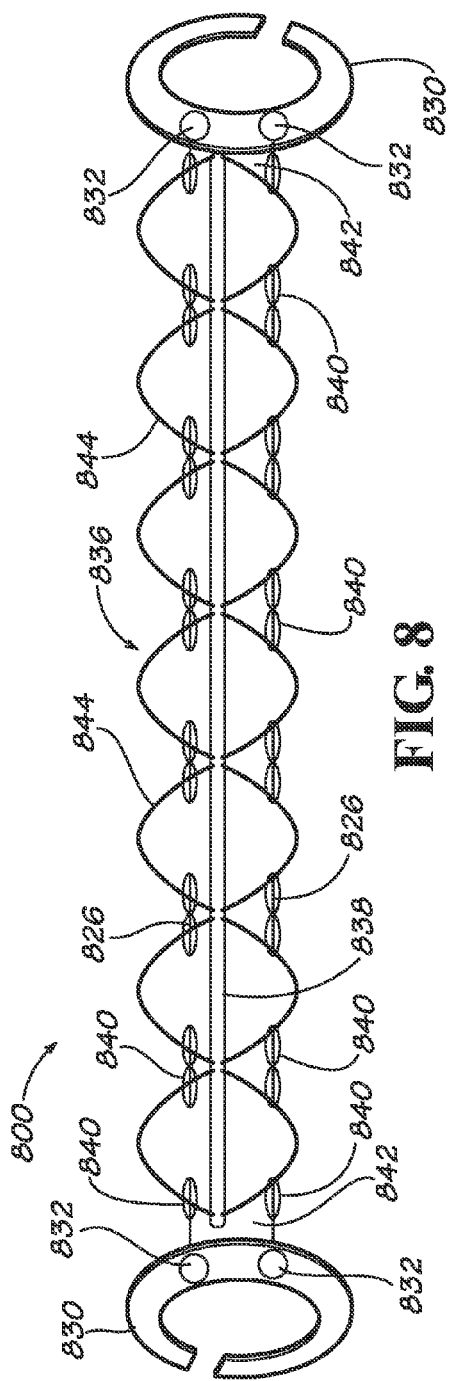
FIG. 8 illustrates the protective cover sleeve device of the present invention extended, with a cover-sleeve with two series of tiny holes along the sleeve and the passage of cords therethrough.

With reference now to FIG. 8 of the DRAWINGS, there is shown the present invention extended out and deployed, generally designated by the reference numeral 800, such as on a cart or other handle. More particularly, the aforementioned cover sleeve 736/836 shown compressed in FIGS. 7A and 7B, is shown pulled out. The cover sleeve 836 is preferably made up of flexible and soft fabric synthetic or non-synthetic, which may possess elastic and stretchable properties. The cover sleeve 836 is preferably hollow and of variable shape, and may be cylindrical, hexagonal, octagonal, square, etc. in cross-section. The cover sleeve 836 is preferably squeezable and collapsible, such as in between the two plates 830 of the right 102 and left 104 sections of container 100. The cover sleeve 836 is preferably snapped together with the cover sleeve 736 material folding along various folds, generally designated by the reference numeral 844. As will be described further hereinbelow, the cover sleeve 836 can be so expanded or unfurled when placing the container device 100 on a handle, as well as collapsed and squeezed back inside the container 100 after use.

With further reference to FIG. 8, the cover sleeve 836 has a substantially linear pattern or series of holes, generally designated by the reference numeral 840, through the folds 844. As described, the cords 826 are threaded or passed through the aforesaid holes 840 along the folds 844 of the cover sleeve 836, and then the cords 836 are securely attached to the plates 830 in the left section 102 and the right section 104 through the holes 832.

The flexible cover sleeve 836 with folding structures 844 has two ends linkages, generally designated by the reference numeral 842, which includes the linkages of the cords 826 to both the right section 102 and the left section 104 of the container. As discussed in connection with FIGS. 4A-C and 5, the cord linkage 842 to the right section 102 connects the cord system to the coils 520, providing tension and the ability to retract and contract the entire apparatus to the small confines of the aforesaid container 100 shown in FIG. 1, housing the present invention. More particularly, the right hand plate 830 is attached to the aforesaid linkage system 842, which connects to the end folding, and then it is tightly fitted within the right section 104. Similarly, the left hand plate 830 is attached to the linkage system 842, which connects to the opposite end folding of the folds 844, and then it is tightly fitted within the left section 102. As discussed, in a preferred embodiment of the present invention, the device 100 is secured to a handle, preferably at the left end thereof, and the left section 102 is secured thereto, and becomes detached from the right section 104, which is then pulled toward the other end of the handle of the cart, and then the right section 104 is tightened and secured onto the handle.

In operation, since the outer end of each of the cords 526 are securely attached at points 832 on the left plate 830, and since the plate 830 is attached to the linkage 842 and inserted into the left section 104 and tightened, the pulling of the right section 104 causes the cords 826, numbering two in this embodiment, to be pulled out and extended toward the other end of the handle. It should be understood that the left or the right section may serve as the initial anchor onto the handle, whereby the device 100, upon separation, causes the cords 826 to tighten when pulled out to deploy the present invention onto the handle. It should also be understood that although two cords 526 are employed in the instant embodiment, multiple cords 526 may be so employed.

Figure 9:
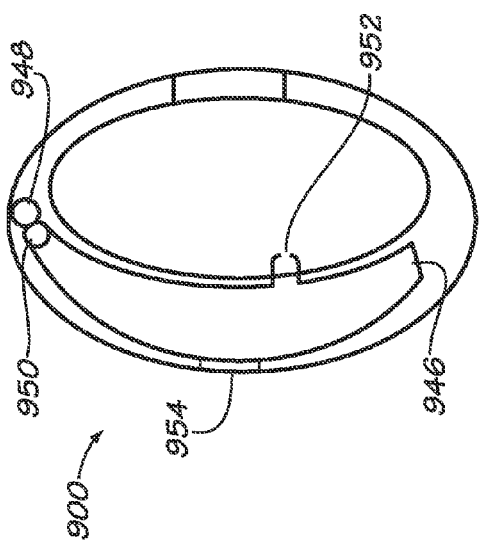
FIG. 9 is a plan view of additional features of one of the components shown in FIG. 2, including a sanitizing system.

With reference now to FIG. 9 of the DRAWINGS, there is illustrated the right section 904 of the container 100. Whereas the left section 102 contains the various coils, the right section 904 in this embodiment of the present invention contains a sanitation system. As shown, a cavity, within the structure of the left section 102, generally designated by the reference numeral 946 (also reference numeral 146 in FIG. 1), receives the sanitation materials, which are usually liquid fluids, through an opening, generally designated by the reference numeral 948. It should be understood that sanitation materials may contain volatile and vaporizable solid materials. After filling in the cavity 146/946 through the opening 948, it is then closed and sealed with a lid, generally designated by the reference numeral 950.

As also shown in FIG. 9, a spray nozzle, generally designated by the reference numeral 952, is shown connected to said cavity 946. The nozzle 952 has a push button or switch, generally designated by the reference numeral 954 (also reference numeral 154 in FIG. 1), which can be operated (or pressed down) from outside in order to spray the aforesaid sanitizing material stored therein. As illustrated, the mouth of the nozzle 952 opens inside the cover sleeve 836. By pressing-down the push button 154/954, the nozzle 952 sprays the sanitizing material inside the cover sleeve 836. In this manner, the inner surface of the cover sleeve 836 is sanitized before expanding or tracking it along a handle on a cart. It should be understood that the nozzle may also be pressed and sanitizing occur while the cover sleeve 736 is placed or a handle or deployed.

Figure 10A:
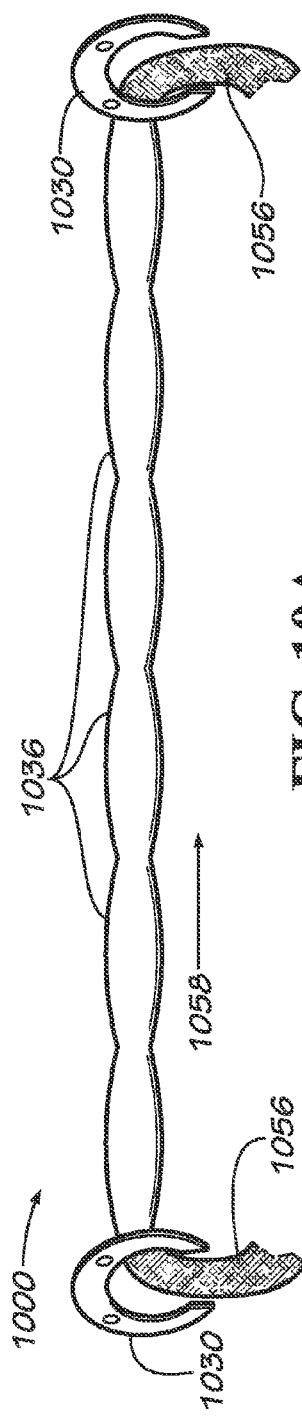
FIG. 10A illustrates the covering sleeve implementation on a shopping cart or handle, the cover sleeve with grippers secured at the left end of the handle of a shopping/service cart in an opened and stretched position rightward, with the covering sleeve deployed.

With reference now to FIG. 10A of the DRAWINGS, there is shown the present invention mounted and deployed on a handle of a cart, generally designated by the reference numeral 1000. In this embodiment, the device 100 (showing just the plates 1030 portion for simplicity) first engages a handle, generally designated by the reference numeral 1056 at the left side of the cart, as shown in the FIGURE. A user slides the device 100 over the handle 1056 to the left hand side, engaging the aforesaid opening 116, and securely fastens the device 100 at the left end. The user then detaches the right section 104 from the left section 102 and holds the right section 104 with their right hand and pulls it in a right-hand direction, generally designated by the reference numeral 1058, to the right side end of the handle 1056, and then fastens the right section 104 securely at the end of the handle bar, thereby deploying the cover sleeve 736 over the entire surface of the handle 1056, eliminating the chance of transmission of pathogens from the handle to the user. It should be understood that this is of great convenience and a preferred technique for right-handed users. In the FIGURE, the plates 1030 for the respective right and left sections 102 and 104 are illustrated for simplicity. It should, of course, be understood that the invention operates in the simple manner shown.

Figure 10B:
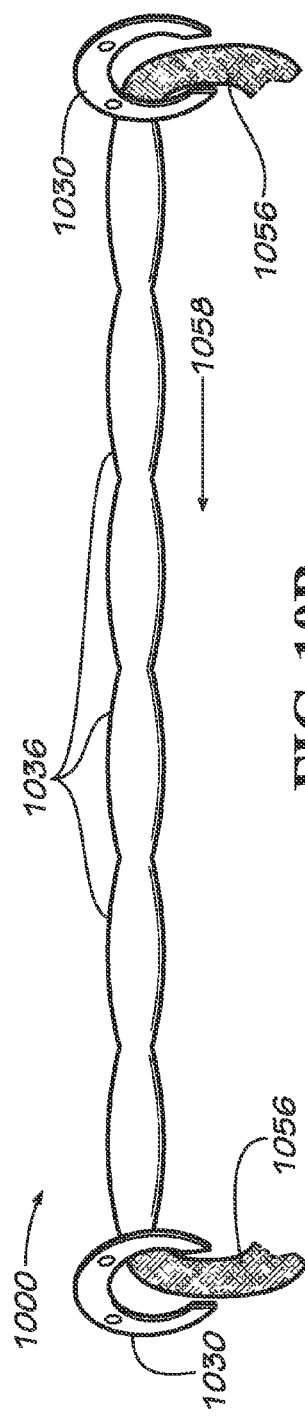
FIG. 10B illustrates the cover sleeve of FIG. 10A with grippers secured at the right-end of the handle of the shopping/service cart in an opened and stretched position leftward, with the covering sleeve.

As for right-handed users, there is a preferred technique for left-handed users, as shown in FIG. 10B of the DRAWINGS, generally designated by the reference numeral 1000. Here, the device 100 is first mounted at the right end of the handle 1056 and the right section 104 is fastened securely at the right end. Then, the user holds the left section 102 with their left hand and pulls it in a left-hand direction, generally designated by the reference numeral 1058, to the leftward end of the handle 1056 and then fastens the left section 102 securely at the end of the handle. As noted hereinabove, it should be understood that this is of great convenience and a preferred technique for left-handed users. It should, of course, be understood that the users of the device 100 may employ their own techniques to deploy the invention.

Figure 10C:
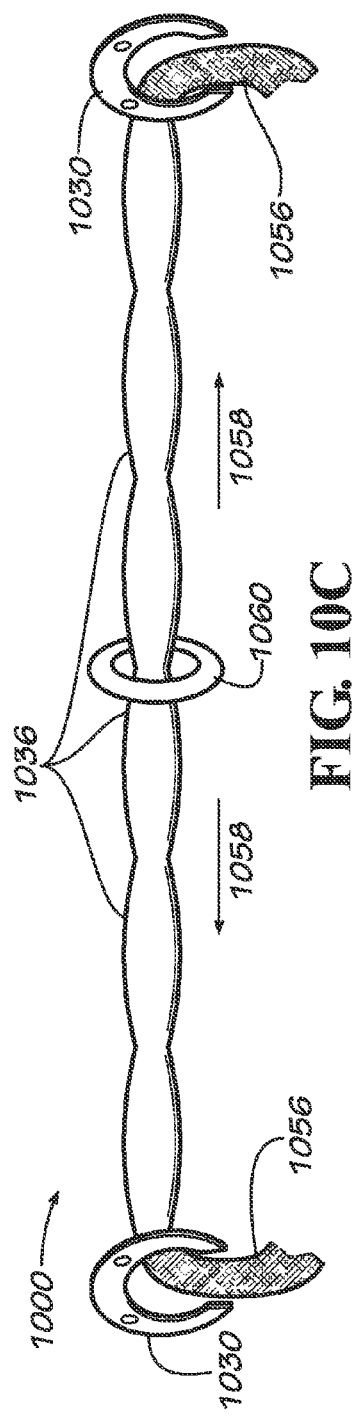
FIG. 10C illustrates the cover sleeve of FIGS. 10A and 10B with grippers secured at the center of the handle of the shopping/service cart in an opened and stretched position both leftward and rightward.

Finally, with reference now to FIG. 10C of the DRAWINGS, there is shown a view of an alternate manner to secure the device to a handle, generally designated by the reference numeral 1000. In this embodiment, the device is mounted at about the center of the handle 1056 and securely locked with a fastener, generally designated by the reference numeral 1060, at the center. In this embodiment, the user holds both the left and right sections with their left and right hands, respectively, and then pulls the left section 102 in the left-hand direction and the right section 104 in the right-hand direction until the respective ends of the handle of the cart. Then, the user fastens the left section 102 onto the handle 1056, and the right section 104 is fastened securely at the right end of the handle.

As noted, there are two base plates 630 securely seated on an inner face of each of the sections/partitions, i.e., the right section 102 and the left section 104 of the container 100, as described hereinabove and illustrated. Each of these plates 630 have tiny holes 632, through which the retractable cords 526 can be inserted and fastened.

The two ends of the retractable cords 526 are fastened to each base plate 630, which is attached to the aforesaid sections 102 and 104. It should be understood that the cords 526 are extensible, retractable back-and-forth, and have an adjustable length in order to accommodate the full length of any cart handle.

In a preferred embodiment of the present invention, the protective covering sleeve 736 is of an accordion shape, and folded and squeezed into a space between the two sections 102 and 104 when not in use. In use, the cover sleeve 736 is stretched/unfolded and expanded from one end to the other end of the handle 1056 in order to cover the full length of the handle 1056 after mounting the device 100 on the handle.

The retractable cords 526 pass through the small holes 840 within the covering/sleeve 736, as illustrated in more detail in FIG. 8, and are attached to respective base plates 630/830, as described. It should be understood that the container device 100 of the present invention is equipped with a retractable reel mechanism, i.e., the aforesaid coil containers 418 keep the coils 520 therein under tension such as when extended, i.e., when the device 100 is in use. The user, nonetheless, can easily overcome the tension within the coils 520, and place and set the device and respective sections thereof, as discussed, rather easily. Of course, pressing the release switch 424 releases this tension or spring energy, causing the coils to retract into their normal coiled state, i.e., the device 100 is compressed for easy storage and carrying. It should also be understood that the protective covering sleeve 736 rests on the cords 526 when they are stretched and extended for covering the handle 1056 of the cart.

As discussed and illustrated in connection with FIG. 9, the right section 104 has small pocket or cavity 946, which contains sanitizing liquid and/or vaporizing materials. The pocket 946 is preferably connected to a narrow tube, which is fitted with spray nozzles 952 operated by a push-button 954. The mouth of the nozzle 952 opens inward towards the inside of the aforesaid accordion-shaped, protective covering sleeve 736. Before extending the protective covering sleeve 736 over the handle 1056 of the cart, the cart user or handler can push the sanitizer button 954 and sanitize the inner surface of the protective covering sleeve 736. Alternatively and as discussed, the user may push the sanitizer button 954 when the protective cover sleeve 736 is fully or partially deployed.

As shown in FIG. 2, there are two adjustable clutches 206, located along an outer face of each of the right and left sections 102 and 104, respectively. As is understood, the clutches 206 allow the user to grip the handle 1056 and fasten the device 100 securely onto the handle 1056 of the cart.

In order to unfold, expand and extend the protective covering sleeve 736 out of the housing case, there is at least one pushbutton 424 to loosen the retractable cords 526. While holding the pushbutton 424 pressed down, one can smoothly pull the other unfastened section of the device, e.g., the right section 104, toward the other end of the handle 1056, and then, when the device 100 is positioned, take off the finger pressure on the pushbutton 424. Once the push button 424 is so released, the cords 526 then lock-in automatically, thereby securely holding the device 100 in place, enabling the full coverage of the handle 1056 and protection from any germs thereon. Now, the user/handler may place their hands on the handle 1056 of the cart in order to push and or pull the cart with full knowledge that they are protected from germs.

In order to remove the device 100 from the handle 1056 of the cart after use, one must first unfasten the clutch 106, and then push down the release button 424 in order to lock it off and loosen and release the cords 526. The cords 526, under tension, simultaneously pull or drag the cover sleeve 736 into its housing cavity 946. This way, the cords 526 are retracted automatically back into the reels or coils 420 causing the protective covering sleeve 736 to fold-in and be squeezed inside the housing space 946.

Once the protective covering sleeve 736 has squeezed fully inside the housing 100, a user can easily dismount the device by unfastening the clutch 106 and taking the device 100 off the handle 1056 of the cart. It should be understood that such closure and dismounting is best done while the device 100 is still on the handle 1056, i.e., the protective cover sleeve 736 collapsed and the left 102 and right sections 104 reconnected. However, it should also be understood that such closure may also be performed without the left 102 and right 104 sections connected, and even with the cover sleeve 736 partially or wholly deployed since the coils 420 and the cords 526 gather the cover sleeve material and collapse it into the housing of the left section 102 in this embodiment.

It should be understood that that the device of the present invention is not only easy to use, but is quite portable. For example, one may clip the device 100 on their waist belt, hang it from a key chain or place it in a pocket or bag, making the device 100 very convenient to carry and unobtrusive.

Indeed, the very light weight and handy size of the device 100, as well as its convenient shape, such as round or oval with smooth edges, makes it quite convenient to carry and use the device 100 without anybody noticing it.

It should be understood that the protective covering sleeve 736 is preferably made up of materials which are durable, flexible and/or elastic, heat and cold resistant, machine washable both in cold and hot water similar to any nylon and nylon-like fabrics, reusable and durable. Therefore, the device 100, as well as, the protective accordion covering sleeve 736 therein, can be used for a long time. The product is intended to become a staple of one's routine, particularly in going to public areas, such as shopping, and may provide great reassurance to more sensitive users, who are germophobic or have particular concerns about cleanliness.

It should also be understood that the aforesaid left and right sections 102 and 104, as well as the other components of the protective cover sleeve device 100 of the present invention may be made of a material having good and durable characteristics, such as plastic, weather resistant, heat and cold resistant, machine washable in hot, warm and cold water, hand washable in hot, warm and cold water, detergent resistant, bleach resistant, and combinations thereof.

It should also be understood that the device is quite eco-friendly. After long use, if and when needed, the accordion covering sleeve 736 can be replaced with a new one. This avoids throwing away the whole device 100, thereby protecting and safeguarding the environment.

It should also be understood that the accordion protective covering sleeve 736, as well as other parts of the device 100, can be customized and made colorful to personalize the device, such as on the outer casing of the device 100, i.e., on sections 102 and/or 104, or perhaps on the surfaces of the folds 844 of the unfurled protective cover sleeve 736. For example, the device 100 can have the user's name written on it, with a return address if lost. Also, the device 100 may have advertising slogans, logos and related items imprinted thereon, offering a means of branding. For example, the device 100 may have a distinctive color and shape.

It should be understood that the covering sleeve can be made of a variety of materials, particularly materials that are preferably flexible, foldable, machine washable in hot, warm and cold water, hand washable in hot, warm and cold water, detergent resistant, bleach resistant, and combinations thereof.

It should also be understood that the covering sleeve may be configured in a variety of ways for unfurlment. For example, the covering sleeve may have a cross-sectional shape such as a circle, oval, elliptical, triangular, square, rectangular, pentagonal, hexagonal, octagonal and combinations thereof.

The device 100 of the present invention is intended to fit to any standard handle 1056, including the handles of shopping baskets, strollers, hand trolleys, elevator handles and carts used in stores, shopping malls, hospitals, airports, amusement parks and cruises. It should, of course, be understood that the uses of the present invention include the easy deployment of a protective covering sleeve 736 over any bar or bar like object, offering many additional potential uses of the present invention.

The previous descriptions are of preferred embodiments for implementing the invention, and the scope of the invention should not necessarily be limited by these descriptions. It should be understood that all articles, references and citations recited herein are expressly incorporated by reference in their entirety. The scope of the current invention is defined by the following claims.

What is claimed are:

1. A protective cover sleeve device comprising:
    a left and a right section, said left and said right sections being detachable from one another;
    a covering sleeve, said covering sleeve connected at one end to said left section and at the opposite end to said right section, said covering sleeve being expandable when said right section and said left section are separated, and retractable; and
    a reel mechanism, said reel mechanism being configured to retract said left section and said right section together,
    wherein said left section, said right section and said covering sleeve have a slot therethrough to engage a handle,
    wherein said protective cover sleeve device is securable to said handle via said slot, and said covering sleeve is deployable over said handle by separating the left section and the right sections from one another,
    wherein upon the deployment of said covering sleeve, said handle is covered by said covering sleeve for protecting against germs.

2. The protective cover sleeve device according to claim 1, wherein said reel mechanism is along at least one of said left and right sections.

3. The protective cover sleeve device according to claim 2, wherein said reel mechanism comprises at least one coil.

4. The protective cover sleeve device according to claim 3, wherein said at least one coil is an retracting coil.

5. The protective cover sleeve device according to claim 2, wherein said at least one of the sections is said left section.

6. The protective cover sleeve device according to claim 1, wherein a plurality of cords are connected to said left and right sections, and therebetween threaded through said covering sleeve along a multiplicity of points.

7. The protective cover sleeve device according to claim 6, wherein two said cords are connected to the left and right sections, and are threaded through the covering sleeve.

8. The protective cover sleeve device according to claim 6, wherein said cords are threaded through a plurality of aligned holes in a plurality of folds of said covering sleeve.

9. The protective cover sleeve device according to claim 6, wherein said cords are attached at both ends to respective plates, and
    wherein said respective plates are secured to said left section and said right section, respectively.

10. The protective cover sleeve device according to claim 9, wherein said cords are attached at both ends to respective linkages, and
    wherein said respective linkages are secured to said respective plates.

11. The protective cover sleeve device according to claim 1, wherein said left section and said right section comprise a clutch mechanism, whereby said left and right sections are capable of separately engaging said handle.

12. The protective cover sleeve device according to claim 11, further comprising:
    at least one release button, whereby upon pressing said release button, said clutch mechanism is disengaged.

13. The protective cover sleeve device according to claim 1, wherein said covering sleeve is made of a material having characteristics selected from the group consisting of: flexible, foldable, machine washable in hot, warm and cold water, hand washable in hot, warm and cold water, detergent resistant, bleach resistant, and combinations thereof.

14. The protective cover sleeve device according to claim 1, wherein said covering sleeve has a cross-sectional shape selected from the group consisting of circles, ovals, ellipticals, triangular, square, rectangular, pentagonal, hexagonal, octagonal and combinations thereof.

15. The protective cover sleeve device according to claim 1, wherein said covering sleeve has a size approximate the dimensions of handles used in services selected from the group consisting of hospitals, stores, shopping markets, airports, loading docks, and combinations thereof.

16. The protective cover sleeve device according to claim 1, wherein said left section and said right section are made of a material having characteristics selected from the group consisting of: plastic, weather resistant, heat and cold resistant, machine washable in hot and cold water, hand washable in hot, warm and cold water, detergent resistant, bleach resistant, and combinations thereof.

17. The protective cover sleeve device according to claim 1, further comprising:
    a sanitizer with a reservoir of sanitizing fluid, and a nozzle; and
    a button disposed on said protective cover sleeve,
    wherein said sanitizing fluid is sprayed within said covering sleeve upon a pressing of said button.

18. A protective cover sleeve device comprising:
    a left and a right section, said left and said right sections capable of detaching from one another;
    at least one coil;
    a covering sleeve, said covering sleeve connected at one end to said at least one coil, which is secured to left section, and at the opposite end to said right section, said covering sleeve capable of expansion when said right section and said left section are separated, and retractable by said coil,
    wherein said left section, said right section and said covering sleeve have a slot therethrough to engage a handle,
    wherein said protective cover sleeve device is securable to said handle via said slot, and said covering sleeve is deployable over said handle by separating the left section and the right sections from one another, said handle is covered by said covering sleeve for protecting against germs; and
    a sanitizer, said sanitizer having a reservoir of sanitizing fluid, a nozzle and a button, said button disposed on said protective cover sleeve, wherein said sanitizing fluid is sprayed within said covering sleeve upon a pressing of said button.

\* \* \* \* \*